United States Patent Office 2,890,255
Patented June 9, 1959

2,890,255

AROMATIC EXTRACTION PROCESS USING CYANO-SUBSTITUTED BORATE ESTERS

Nathaniel L. Remes, Elgin, and Thomas W. Martinek, Round Lake, Ill., assignors to The Pure Oil Company, Chicago, Ill., a corporation of Ohio No Drawing. Application July 9, 1957
Serial No. 670,659

10 Claims. (Cl. 260—674)

This invention relates to a method for the separation and recovery of aromatic hydrocarbons from a mixture of hydrocarbons, particularly paraffinic hydrocarbons containing the aromatic hydrocarbons. In a more specific aspect, this invention relates to the removal and recovery of aromatic hydrocarbons from admixture with paraffinic hydrocarbons using a selective solvent. In another specific aspect this invention relates to the use of certain cyano-substituted borate esters as selective solvents for the separation of aromatic hydrocarbons from mixtures of aromatic hydrocarbons and paraffin hydrocarbons.

Mixtures which contain some or all types of hydrocarbons, including paraffins, cyclo-paraffins, olefin, diolefin and aromatic hydrocarbons, are generally formed in processes used for converting hydrocarbons. Separation of these mixtures into fractions consisting essentially of hydrocarbons of the same number of carbon atoms per molecule and having the same boiling points is usually accomplished by fractional distillation. Further separation of the fractions so produced into reasonably pure hydrocarbons is very often difficult by conventional fractionation processes because the hydrocarbons which have the same number of carbon atoms per molecule usually have boiling points which are relatively close together. Of the various methods which have been proposed for further effecting the separation of these mixtures or fractions, the most practical from the standpoint of large scale production have been those in which the mixture of hydrocarbons is contacted with a solvent which has a preferential solubility for one or more of the hydrocarbon components in the fractions.

Accordingly, the art of selective solvent extraction for the separation of hydrocarbon compounds has developed. Processes of solvent extraction or extractive distillation can generally be employed depending upon the characteristics of the extractive solvent and the hydrocarbons to be separated. This art has developed to the point where a rather large group of organic selective solvents is available. Specialized solvents such as cyano-alkyl ethers, sulfides, dinitrile amines, dicyano-ethers, cyanamids and dinitriles have been developed for this purpose. Some of these solvents are quite efficient for their intended purpose. However, the general class of nitriles which are known in this solvent extraction art possess one or more very serious shortcomings. Their boiling points may be too low for economical use. These compounds may possess insufficient miscibility with the aromatic hydrocarbons to effectuate economical separation. Or, on the other hand, they may possess excess solubility in the paraffinic hydrocarbons, which is undesirable where aromatic purification is the primary purpose of the process. Further, these compounds in many instances possess insufficient selectivity toward aromatics and are thermally unstable. This invention is directed particularly to the separation of hydrocarbon mixtures which are difficult to separate by distillation means by employing as solvents cyano-substituted borate esters having the following generic formula:

(1) $\quad B[OZ(CN)_m]_3$ wherein Z is a polyvalent organic radical selected from the group of alkyl, aryl, alkylaryl and arylalkyl groups such that compounds of the following subgeneric formulas are represented.

(2) 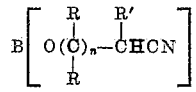

and (3) $\quad B[OAr(CN)_m]_3$ where R and R' may all be the same or different and are selected from the group consisting of hydrogen, alkyl, cyclo-alkyl, and aryl and alkaryl groups, $n$ is zero or an integral whole number, Ar is an aromatic nucleus, and $m$ is an integer from 1 to 5 inclusive.

Non-limiting examples of compounds coming within the above formulas are:

Tri-cyanoethyl borate
Tri-(1-cyanoethyl) borate
Tri-(1-cyanopropyl) borate
Tri-(2-cyanopropyl) borate
Tri-(4-cyanophenyl) borate
Tri-(2-cyanophenyl) borate
Tri-(2, 4-dicyanophenyl) borate
Tri-(cyanopropyl) borate
Tri-(cyanobutyl) borate
Tri-(cyanopentyl) borate
Tri-(cyanohexyl) borate
Tri-(2-cyanomethyl) borate
Tri-(1-cyanobenzyl) borate
Tri-(2-cyano-1-phenylethyl) borate It becomes, therefore, the primary object of this invention to provide a method for the separation of aromatic hydrocarbons from mixtures containing aromatic hydrocarbons and paraffinic hydrocarbons.

It is another object of this invention to provide a new selective solvent for the solvent and/or extractive distillation processes wherein the separation of mixtures of aromatic hydrocarbons and paraffinic hydrocarbons into their component parts is accomplished.

It is another object of this invention to provide a new selective solvent comprising cyano-substituted borate esters of the general formula:

$$B[OZ(CN)_m]_3$$

wherein Z is a polyvalent organic radical and $m$ has a value of from 1 to 5 inclusive.

It is still another object of this invention to use tri (2-cyanoethyl) borate as a selective solvent.

Other objects and advantages of this invention will become apparent to one skilled in the art as the description thereof proceeds.

According to the present invention, aromatic hydrocarbons are selectively separated from paraffinic hydrocarbons by treatment with a solvent comprising the above-defined cyano-substituted borate esters. To carry out the process it is only necessary to contact the aromatic-containing hydrocarbon mixture with the cyano-substituted borate ester under such conditions of temperature and pressure that the aromatic hydrocarbons are dissolved in the cyano-substituted borate esters and can be recovered by subsequent treatment. The solvent may be contacted with the aromatic-paraffinic mixture in any manner which assures intimate contact of solvent and feed. For example, conventional packed towers may be used with countercurrent flow of feed and solvent. Successive mixing zones followed by settling zones may be used. The high boiling point and thermal stability of the cyano-substituted borate esters of this invention permit their ready recovery from the extract stream for recycling.

In carrying out the process, the solvent-to-feed ratios may vary widely, and a range of about 0.5 to 20 volumes of solvent per volume of aromatic-containing hydrocarbon mixture in the feed stock being used may be employed. However, ratios of 1–5 volumes of solvent per volume of aromatic hydrocarbon in the mixture will generally give good results. The extraction may be conducted at sub-atmospheric, atmospheric, or super-atmospheric pressures and at any temperature up to the boiling point of the lightest component in the system at the extraction pressure. The preferred conditions are substantially atmospheric pressure and a temperature of about 50 to 125° F.

The process of solvent extraction as used herein is intended to mean those processes in which the separation of mixtures of different substances is accomplished by treatment in the liquid phase with a selective liquid solvent. By extractive distillation as is used in this specification is meant any distillation in the presence of a substance which is relatively non-volatile compared to the compounds to be separated and which substance increases the relative volatility of the compounds to be separated.

In order to illustrate the invention, a number of non-limiting examples are given:

A number of experiments were carried out in which the best known nitrile solvents such as oxydipropionitrile and iminodipropionitrile were compared with tri (2-cyanoethyl) borate. In these experiments, 5 ml. samples of each solvent were mixed with 5 ml. portions of benzene, heptane, and mixtures consisting of 30 volume percent toluene with 70 volume percent heptane, and 30 volume percent benzene with 70 volume percent heptane. After thorough mixing of the solvent and the hydrocarbon mixtures, the volume changes in the phases and the percent selectivity were observed. The results are shown in the following table:

TABLE I

| Hydrocarbon | Solvent | Solvent Phase | |
| --- | --- | --- | --- |
| | | Initial Volume (cc.) | Final Volume (cc.) |
| Benzene | tri(2-cyanoethyl) borate | 5.0 | [1] 10.0 |
| Do | oxydipropionitrile | 5.0 | [1] 10.0 |
| Do | iminodiproprionitrile | 5.0 | [1] 10.0 |
| Heptane | tri(2-cyanoethyl)borate | 5.0 | 5.0 |
| Do | oxydiproprionitrile | 5.0 | 5.05 |
| Do | iminodipropionitrile | 5.0 | 5.0 |
| 70% heptane–30% benzene | tri(2-cyanoethyl)borate | 5.0 | 5.9 |
| Do | oxydipropionitrile | 5.0 | 5.75 |
| Do | iminodipropionitrile | 5.0 | 5.72 |
| 70% heptane–30% toluene | tri(2-cyanoethyl)borate | 5.0 | 5.60 |

[1] Completely miscible.

From the data in Table I it may be seen that the tri (2-cyanoethyl) borate is completely miscible with the aromatic portion of the hydrocarbon mixtures and immiscible with the paraffinic hydrocarbons. The data also points up the higher selectivity for benzene than the nitriles used in comparison.

The invention is further illustrated by the non-limiting examples.

*Example I*

A mixture consisting of equal volumes of benzene and tri (2-cyanoethyl) borate was subjected to simple distillation. Pure benzene having a refractive index $n^{20}_D$ of 1.4999 was recovered in a yield of 90.0 volume percent. This demonstrates that the borate ester solvents of this invention can be recovered from mixtures with the extracted aromatic hydrocarbons. This distillation took place up to 200° F.

*Example II*

The extract phase which resulted from contacting a mixture consisting of 70% v. heptane and 30% v. benzene with tri (2-cyanoethyl) borate was distilled as in Example I. The distillate was at least 80% benzene. Distillate obtained by distilling the raffinate phase from the same extraction contained only about 10–13% benzene.

*Example III*

A mixture comprising 5 cc. of methyl borate and 5 cc. of heptane was prepared at room temperature. The mixture was completely homogeneous, the methyl borate being completely soluble in the heptane. No phase separation occurred on standing for 1 day.

*Example IV*

A mixture comprising 5 cc. of tri (2-chloroethyl) borate and 5 cc. of heptane was prepared as in Example III with the same results.

The experiments conducted in Examples III and IV demonstrate the importance of the cyano group in the borate esters and the fact that without this group the esters are inoperative for the purpose of separating aromatics from paraffins.

What is claimed is:

1. The process for the separation of aromatic hydrocarbons from hydrocarbon mixtures containing same which comprises contacting said hydrocarbon mixtures at ambient temperatures with a solvent having the following general formula:

$$B[OZ(CN)_m]_3$$

wherein Z is a polyvalent organic-radical selected from the group consisting of alkyl, aryl, alkaryl and arylalkyl groups, m is an integer of from 1 to 5.

2. The process in accordance with claim 1 in which Z is an alkyl group.

3. The process in accordance with claim 1 in which Z is an aryl group.

4. The process in accordance with claim 1 is which Z is an alkaryl group.

5. The process in accordance with claim 1 in which Z is an arylalkyl group.

6. The process in accordance with claim 1 in which said aromatic hydrocarbon is selected from the group consisting of benzene, toluene, xylene, ethylbenzene and propyl-benzene.

7. The process in accordance with claim 2 in which Z is an ethyl group and m is equal to 1.

8. The process in accordance with claim 2 in which Z is a propyl group and m is equal to 1.

9. The process in accordance with claim 3 in which Z is a phenyl group and m is equal to 1.

10. The process in accordance with claim 3 in which Z is a phenyl group and m is equal to 2.

No references cited.